:::
United States Patent [19]
Nasu

[11] Patent Number: 6,088,262
[45] Date of Patent: Jul. 11, 2000

[54] SEMICONDUCTOR DEVICE AND ELECTRONIC EQUIPMENT HAVING A NON-VOLATILE MEMORY WITH A SECURITY FUNCTION

[75] Inventor: Hiroaki Nasu, Suwa, Japan

[73] Assignee: Seiko Epson Corporation, Tokyo, Japan

[21] Appl. No.: 09/028,475

[22] Filed: Feb. 24, 1998

[30] Foreign Application Priority Data

Feb. 27, 1997 [JP] Japan .................................... 9-044395
Feb. 6, 1998 [JP] Japan ................................. 10-041180

[51] Int. Cl.[7] .................................................. G11C 16/04
[52] U.S. Cl. ...................... 365/185.04; 365/195; 365/196
[58] Field of Search ............................... 365/185.04, 195, 365/196

[56] References Cited

U.S. PATENT DOCUMENTS

| | | | |
|---|---|---|---|
| 5,818,771 | 10/1998 | Yasu et al. ............................... | 365/145 |
| 5,881,002 | 3/1999 | Hamakawa ............................... | 365/195 |
| 5,892,711 | 4/1999 | Park ................................... | 365/185.04 |
| 5,917,750 | 6/1999 | Miyakawa et al. ................. | 365/185.04 |

FOREIGN PATENT DOCUMENTS 62-194565   8/1987   Japan .

Primary Examiner—Richard T. Elms
Assistant Examiner—Tuan T. Nguyen
Attorney, Agent, or Firm—Oliff & Berridge, PLC

[57] ABSTRACT

A semiconductor device which can be re-used even if the read protection is set for a non-volatile memory included therein, and electronic equipment including such a semiconductor device. The data written in a memory cell array is protected from being read out from the outside for security. Only when erase of all data in the memory cell array is detected, the read protection is released. Thus, a microcomputer can be refused. The detection with respect to whether or not all data has been erased can be accomplished through execution of a flash erase operation or by reading out all address data. A read protection control circuit includes an EEPROM for storing information that the read protection is enabled. A plurality of such EEPROM's are used. If the read protection for the memory cell array is enabled, the erase/write to the EEPROM's are inhibited. The memory cell array is controlled separately from the EEPROM's. In the normal operation mode, the read-out of data by CPU is permitted. Such a configuration may be applied to a semiconductor device including a gate array block.

17 Claims, 18 Drawing Sheets

:::

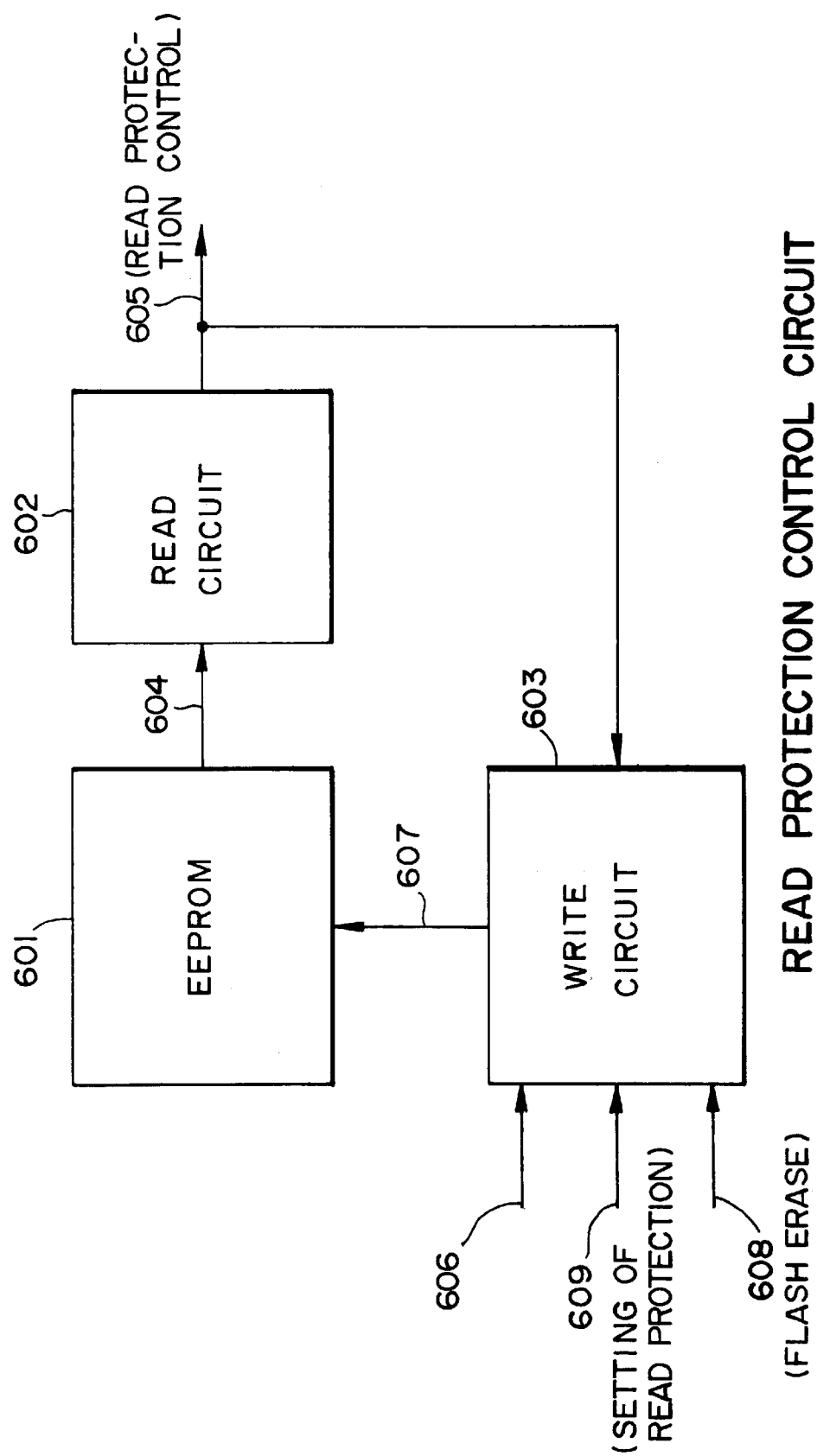

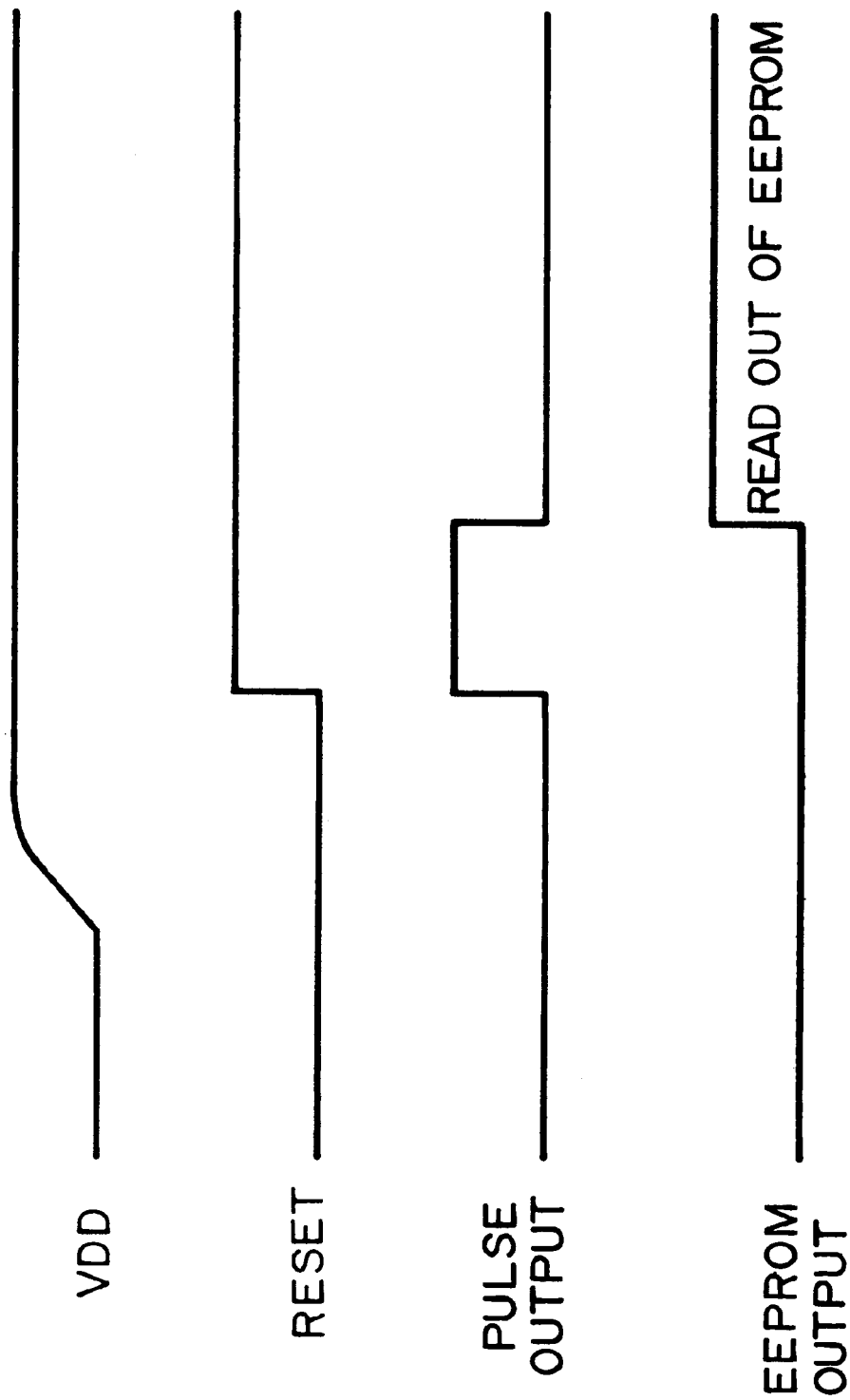

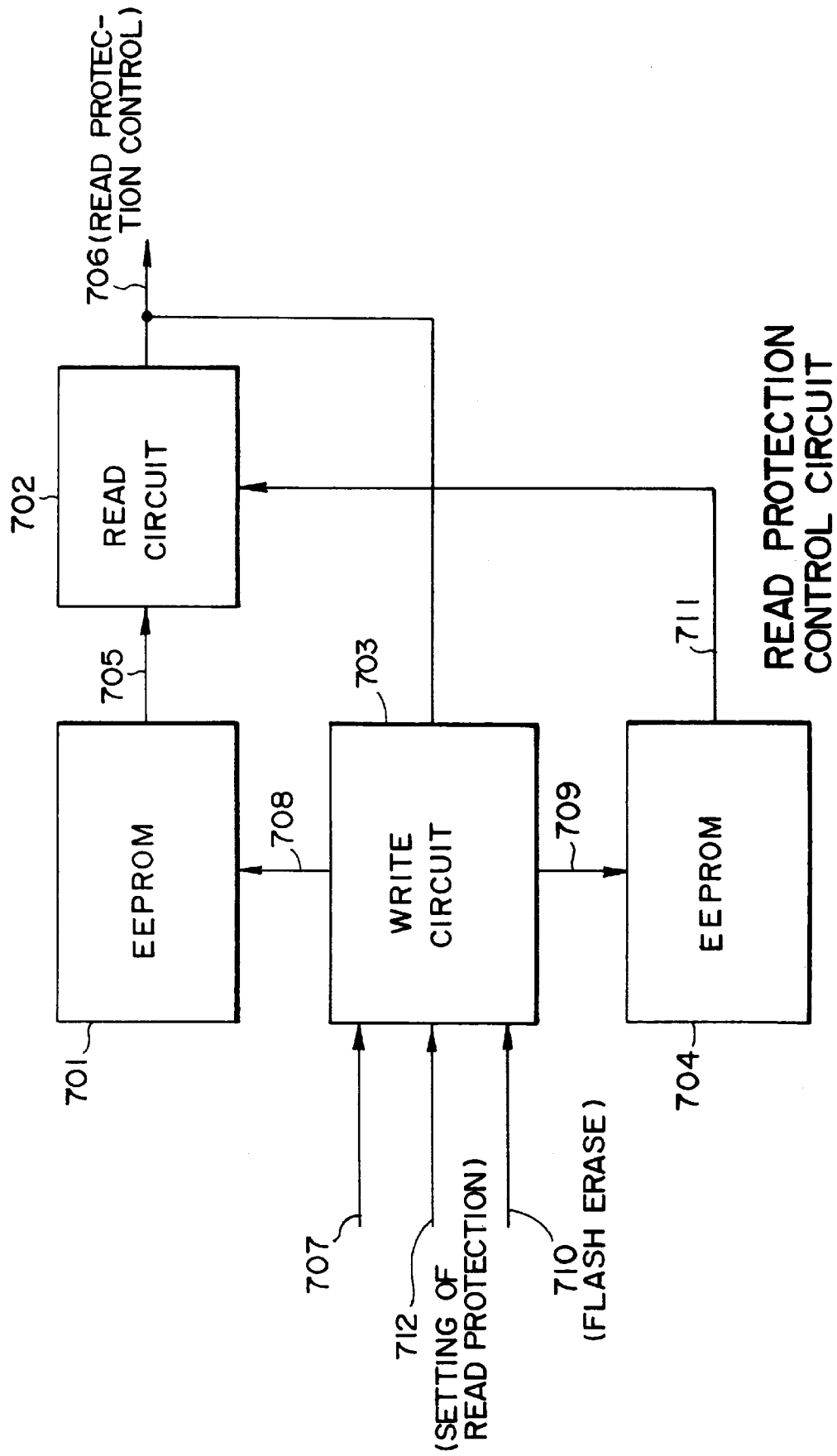

READ CIRCUIT

| 705 | 711 | 706 |
|---|---|---|
| L(INHIBITION) | L(INHIBITION) | H(INHIBITION) |
| L(INHIBITION) | H(PERMISSION) | H(INHIBITION) |
| H(PERMISSION) | L(INHIBITION) | H(INHIBITION) |
| H(PERMISSION) | H(PERMISSION) | L(PERMISSION) |

READ CONTROL CIRCUIT

READ CONTROL CIRCUIT

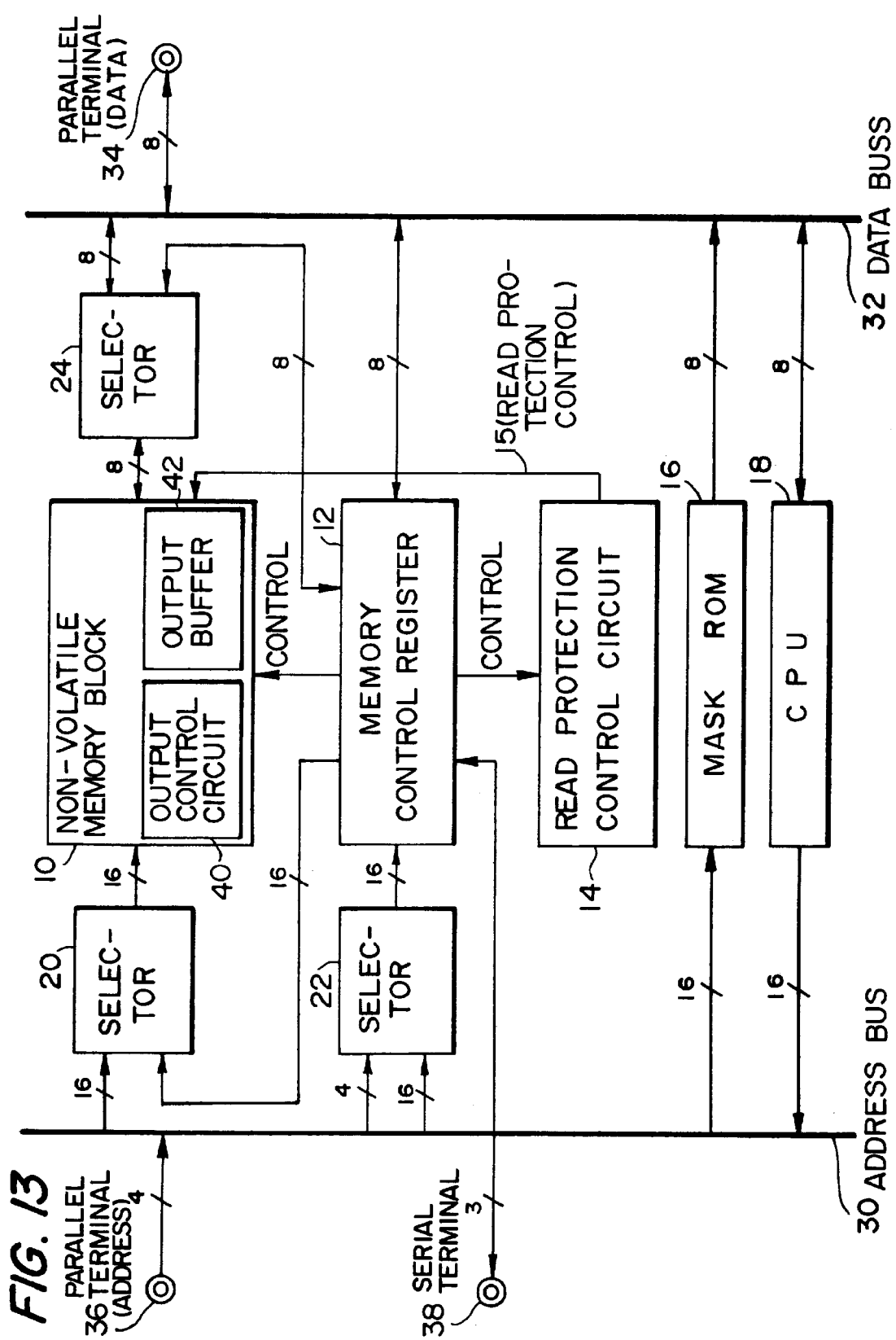

FIG. 14

MEMORY CONTROL REGISTER

| REGISTER ADDRESS | BITS | BIT NAME | FUNCTION |
|---|---|---|---|
| 0 0 0 0 0 0 | D7~D0 | MA15~MA8 | HIGHER MEMORY ADDRESS |
| ⋮ | D7~D0 | MA7~MA0 | LOWER MEMORY ADDRESS |
| ⋮ | D7~D0 | MD7~MD0 | MEMORY DATA |
| ⋮ | D7~D0 | SD7~SD0 | SERIAL DATA |
| ⋮ | D7~D4 | SC3~SC0 | SERIAL CONTROL |
| ⋮ | D3~D0 | SS3~SS0 | SERIAL STATUS |
| ⋮ | D7 | ERASE | ERASE |
| ⋮ | D6 | FLASH | FLASH ERASE |
| ⋮ | D5 | PROG | PROGRAM |
| ⋮ | D4 | PROT | PROTECT |
| ⋮ | D3 | ER348 | VERIFY FLASH ERASE |
| ⋮ | ⋮ | ⋮ | ⋮ |

| 1308 | 1309 | |
|---|---|---|
| L (PERMISSION) | H (NORMAL MODE) | PERMISSION OF DATA READ-OUT |
| H (INHIBITION) | H (NORMAL MODE) | PERMISSION OF DATA READ-OUT |
| L (PERMISSION) | L (OTHER MODE) | PERMISSION OF DATA READ-OUT |
| H (INHIBITION) | L (OTHER MODE) | INHIBITION OF DATA READ-OUT |

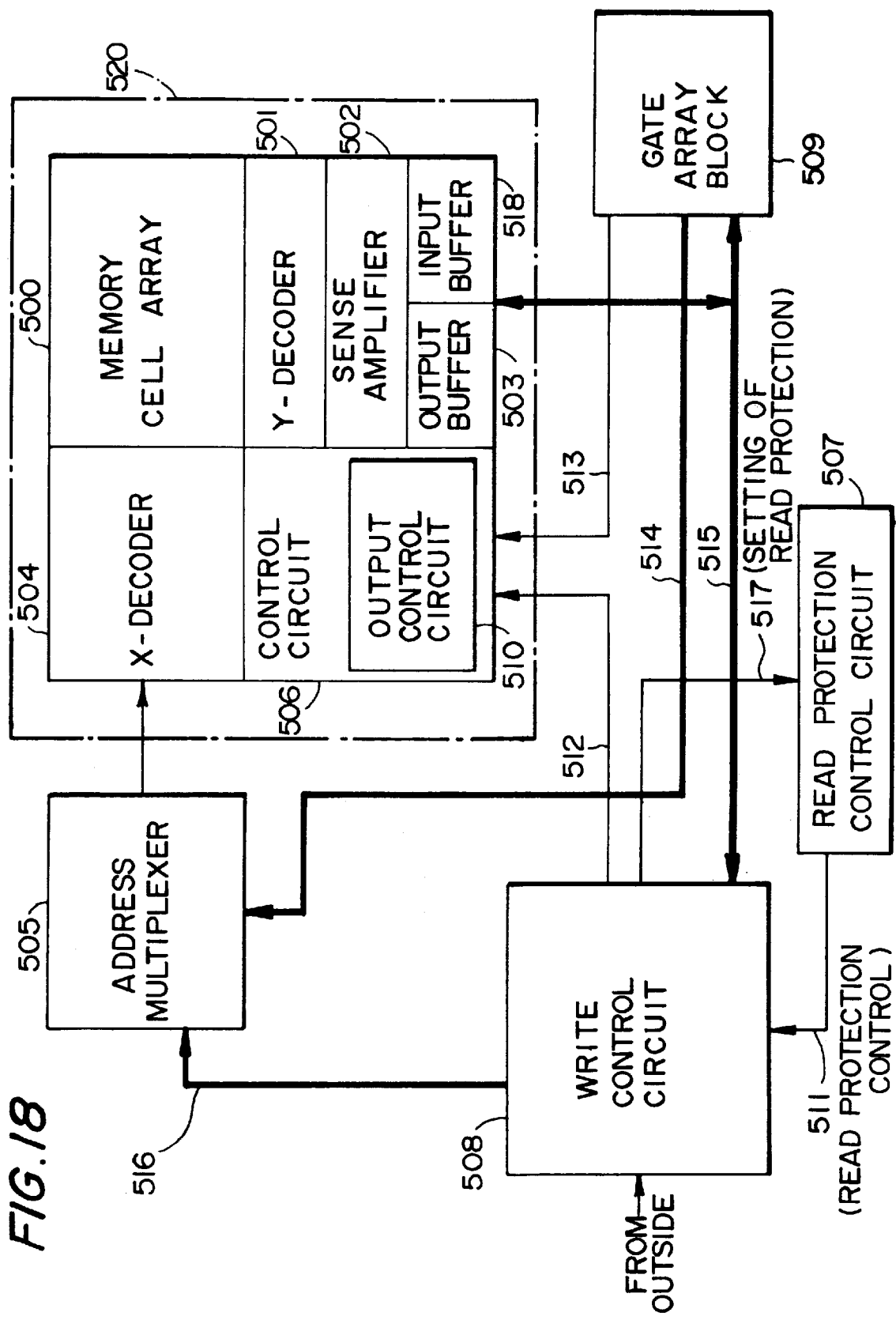

SEMICONDUCTOR DEVICE AND ELECTRONIC EQUIPMENT HAVING A NON-VOLATILE MEMORY WITH A SECURITY FUNCTION

BACKGROUND OF THE INVENTION

1. Field of Invention

The present invention relates to a semiconductor device having a non-volatile memory, such as a microcomputer, and also to electronic equipment including such a semiconductor device.

2. Prior Art

In semiconductor devices of the above type, it is desirable that they have a security function for protecting a program from being falsely copied by third parties. One technique of realizing such a security function is to set read protection for the data in a non-volatile memory by means of protection bits, as disclosed in Japanese Patent Application Laid-Open No. 62-194565. In this case, read protection may be set by utilizing an erasable programmable read-only memory (EPROM) which is a second non-volatile memory or by utilizing an electrically erasable and programmable read-only memory (EEPROM).

However, the technique of utilizing the EPROM has a problem in that a semiconductor device will not be able to be re-used once the information that read protection is enabled has been stored in the EPROM. In other words, read protection cannot be released unless after the resin package in which the semiconductor device is mounted has peeled, the EPROM therein is irradiated by a radiation such as ultraviolet rays to change the contents stored in the EPROM. This means that the semiconductor device will never be re-utilized after read protection has been released.

On the other hand, the other technique of utilizing the EEPROM has a problem in that read protection can easily be released by third parties. To overcome such a problem, it is required that read protection once set cannot be released. However, this will resultingly preclude the re-use of the semiconductor device.

SUMMARY OF THE INVENTION

In view of the aforementioned problems of the prior art, an object of the present invention is to provide a semiconductor device which can be re-used even if read protection is set for a non-volatile memory included therein and an electronic equipment including such a semiconductor device.

According to one aspect of this invention, there is provided a semiconductor device comprising:

a first non-volatile memory in which data can be written and from which data can be erased electrically from the outside of the semiconductor device;

read protection means for protecting data written in the first non-volatile memory from being read out from the outside for security of data; and release means for releasing the read protection for the first non-volatile memory when erase of all data in the first non-volatile memory is detected.

The read protection means can protect the data written into the first non-volatile memory. Since the read protection is released when all the data have been erased from the first non-volatile memory, the semiconductor device can be re-used. Thus, not only the protection of data written into the first non-volatile memory, but also the re-usable semiconductor device can be provided.

In this semiconductor device, a flash erase operation may be carried out for erasing all data in the first non-volatile memory; and erase of all data in the first non-volatile memory can be detected based on whether the flash erase operation is performed or not. It can be detected in a simple manner that all data is erased from the first non-volatile memory.

The data in the first non-volatile memory may be erased in any one of pages and blocks by specifying an address; and erase of all data in the first non-volatile memory can be detected by reading out all address data of the first non-volatile memory. All data in the first non-volatile memory can be erased without execution of the flash erase operation, and erase of all data can be detected. This can increase the lifetime of the first non-volatile memory.

The read protection means may include at least one second non-volatile memory in which data can be written, from which data can be erased electrically, and which stores information that the read protection for the first non-volatile memory is enabled. Even if the semiconductor device is powered off, the read protection can be maintained. Furthermore, the contents in the second non-volatile memory can electrically be re-written.

The read protection means may protect the second non-volatile memory from being written or erased when the second non-volatile memory stores the information that the read protection for the first non-volatile memory is enabled; and the read protection means may permit the second non-volatile memory to be written or erased when erase of all data in the first non-volatile memory is detected. The data in the first non-volatile memory can be securely protected by protecting the second non-volatile memory from being written or erased if the information that the read protection for the first non-volatile memory is enabled is stored in the second non-volatile memory. Furthermore, the read protection and release of read protection can be reset by permitting the second non-volatile memory to be written or erased if erase of all data in the first non-volatile memory is detected.

Whether the read protection for the first non-volatile memory will be enabled or disabled may be determined based on the contents stored in the second non-volatile memory which are read out when the semiconductor device is powered on. Thus, the determination can be executed each time when the semiconductor device is powered on. This can securely protect the data in the first non-volatile memory.

The write and erase operations in the first non-volatile memory may be controlled separately from the write and erase operations in the second non-volatile memory. The control can be simplified with prevention of semiconductor device being increased in scale.

The read protection means may have a plurality of the second non-volatile memories; and the read protection means can protect data in the first non-volatile memory from being read out from the outside when at least one of signals output from the second non-volatile memories indicates that the read protection for the first non-volatile memory is enabled. The simultaneous use of the second non-volatile memories can greatly improve the reliability in the security of data in the first non-volatile memory.

The read protection for the first non-volatile memory and release of the read protection may be executed through a central processing unit (CPU) included in the semiconductor device. Thus, the read protection and release of the read protection can be realized without providing any specific internal or external write control circuit.

The read protection means may protect data in the first non-volatile memory from being read out from the outside by controlling an output buffer which outputs data stored in the first non-volatile memory, or by controlling a read control circuit which controls read of data stored in the first non-volatile memory from the outside. There are various techniques for protecting the data in the first non-volatile memory from being read out from the outside.

In a normal operation mode, in which one of a CPU and a logical function block operates based on data stored in the first non-volatile memory, one of the CPU and the logical function block can read out data stored in the first non-volatile memory even if the read protection for the first non-volatile memory is enabled; and in any mode other than the normal operation mode, one of the CPU and the logical function block can read out data stored in the first non-volatile memory only when the read protection for the first non-volatile memory is released. In the normal operation mode, thus, the CPU or logical function block can operate based on the data stored in the first non-volatile memory. In any mode other than the normal operation mode such as a programming mode, the data in the first non-volatile memory can securely be protected.

The semiconductor device may further comprise a CPU which operates based on data stored in the first non-volatile memory. This can provide a microcomputer which can provide not only the protection of data but also the re-usability of the semiconductor device.

The semiconductor device may further comprise a logical function block which operates based on data stored in the first non-volatile memory. Such a logical function block may be any of various types such as a gate array block.

According to another aspect of the present invention, there is provided electronic equipment comprising any of the aforementioned semiconductor devices, input means for inputting data into the semiconductor device, and output means for outputting at least one of image and sound under control of the semiconductor device. The data required to activate the electronic equipment can be protected while the electronic equipment or the semiconductor device used therein can be re-used.

BRIEF DESCRIPTION OF THE DRAWINGS

FIG. 2 is a functional block diagram of a configuration of a read protection control circuit.

FIG. 4A is a view showing a write circuit while

FIG. 6 is a timing chart illustrating the operation of the semiconductor device when it is powered on.

FIG. 8 is a functional block diagram illustrating another read protection control circuit.

FIG. 9A is a view showing a read circuit while FIG. 9B is the truth table thereof.

FIG. 13 is a functional block diagram of a configuration of a further microcomputer.

FIG. 14 is a table showing a configuration of a memory control register.

FIG. 15A is a view showing a configuration of an output control circuit and an output buffer while FIG. 15B is the truth table thereof.

FIG. 18 is a functional block diagram of a configuration of a semiconductor device including a logical function block.

DESCRIPTION OF THE PREFERRED EMBODIMENTS

Some preferred embodiment of the present invention will now be described with reference to the accompanying drawings. Although the present invention will be described as being applied to a microcomputer which is one semiconductor device, it should be understood that the present invention is not limited to such a microcomputer, but may be applied to any of various semiconductor devices.

1. Configuration

Figure 1:
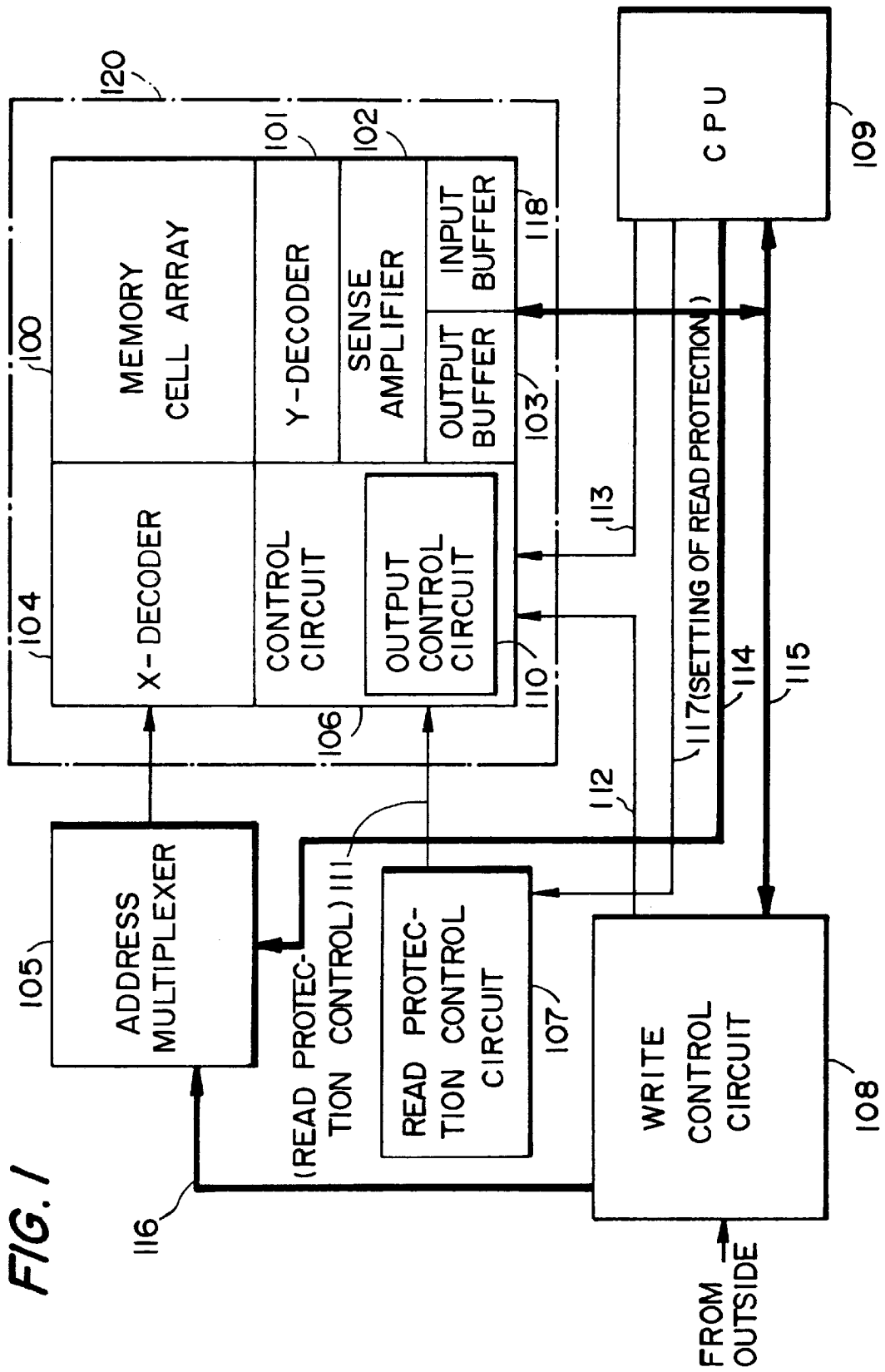
FIG. 1 is a functional block diagram of a configuration of a microcomputer constructed in accordance with one embodiment of the present invention.

FIG. 1 is a functional block diagram of a microcomputer constructed according to one embodiment of the present invention.

A non-volatile memory block 120 comprises a memory cell array (first non-volatile memory) 100 consisting of a plurality of non-volatile memory cells, an X-decoder 104, a Y-decoder 101, a sense amplifier 102, an output buffer 103, an input buffer 118 and a control circuit 106. The control circuit 106 is responsive to control signals 112 and 113 from a write control circuit 108 and CPU 109 to perform the control of the X-decoder 104, Y-decoder 101, sense amplifier 102, output buffer 103 and input buffer 118. The control of the output buffer 103 is also performed by an output control circuit 110 included in the control circuit 106.

The write of various data such as programs, image data, sound data and so on into the non-volatile memory block 120 will be performed as follows: First of all, an address and a data to be written into that address are read in from an external means outside the microcomputer through the write control circuit 108. The address is decoded by an address multiplexer 105 and then inputted into the non-volatile memory block 120. The data is inputted into the non-volatile memory block 120 through the write control circuit 108 and a data bus 115. The inputted address is written into an address specified by the multiplexer 105 under control of the control circuit 106. Thus, the user's programming of data to the non-volatile memory block 120 is completed.

A verify operation for verifying whether or not the data has been properly written in the non-volatile memory block 120 may be executed by the CPU 109 or externally through the write control circuit 108.

The CPU 109 uses an address signal 114 with the control signal 113 to read the programmed data out of the non-volatile memory block 120 through the data bus 115. The CPU 109 operates based on the read data (including programs, image data, sound data and so on) to execute a given procedure according to the user's program.

In this embodiment, data in the non-volatile memory block 120 can be protected from being read out from the outside by storing information for the read protection in the read protection control circuit 107. Thus, the data can be protected. In FIG. 1, the read protection is set by activating a read protection setting signal 117 through the CPU 109.

2. Read Protection Control Circuit

FIG. 2 shows an example of the read protection control circuit 107. The read protection control circuit 107 comprises an EEPROM 601 (second non-volatile memory), a read circuit 602 and a write circuit 603. The write circuit 603 first uses an erase signal contained in a control signal 606 to perform an erasing operation for the EEPROM 601. The read protection control circuit 107 is responsive to a read protection setting signal 609 (117 in FIG. 1) to determine whether or not the read protection should be set. If the read protection should be set, the read protection control circuit 107 uses a write signal contained in the control signal 606 to store the EEPROM 601 with the information for the read protection. If the EEPROM 601 has been initially erased, however, the erasing operation is not necessarily required.

In this embodiment, the read protection setting signal 609 made H level means that the read protection is set. In this case, L level information is written into the EEPROM 601 placed in the erased state. On the other hand, the read protection setting signal 609 made L level means that the read protection is released. In this case, H level information is written into the EEPROM 601 placed in the erased state. In this embodiment, data are written into the EEPROM 601 in either of the read protection or the release of read protection. However, the EEPROM 601 is in H level when it is placed in its erased state. When the read protection is released, therefore, the erased state in the EEPROM 601 may mean the release of read protection without purposely writing of H level information into the EEPROM 601.

The data written into the EEPROM 601 is then read by the read circuit 602. A read protection control signal 605 (111 in FIG. 1) becomes H level in the state of read protection and L level in the state of read-out permissible. As the read protection control signal 605 becomes H level any read-out of data from the memory cell array 100 shown in FIG. 1 is inhibited. As the read protection control signal 605 becomes L level, the read-out of data is permitted (or the read protection is released).

Figure 3A:
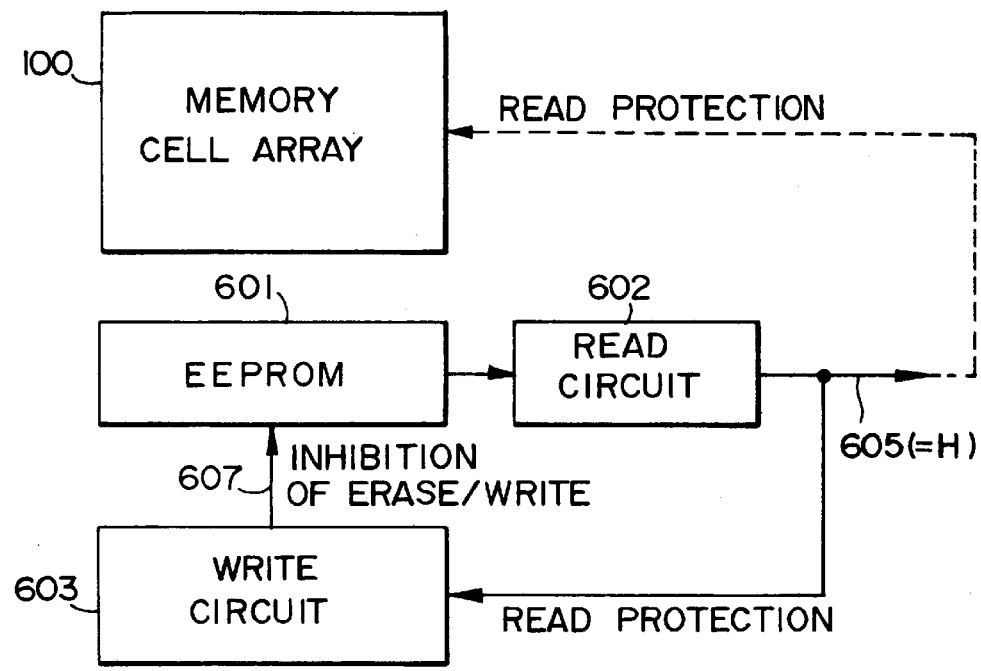
FIGS. 3A and 3B illustrate the operation of the read protection control circuit.

The read protection control signal 605 is then fed back to the write circuit 603. Information for the read protection is stored in the EEPROM 601. As the read protection control signal 605 becomes H level, any erase and write relative to the EEPROM 601 are inhibited in response to the read protection control signal 605, as shown in FIG. 3A. This ensures that information for the read protection stored in the EEPROM 601 will not be re-written. Thus, the data programmed in the memory cell array 100 (non-volatile memory block) can be protected.

Figure 3B:
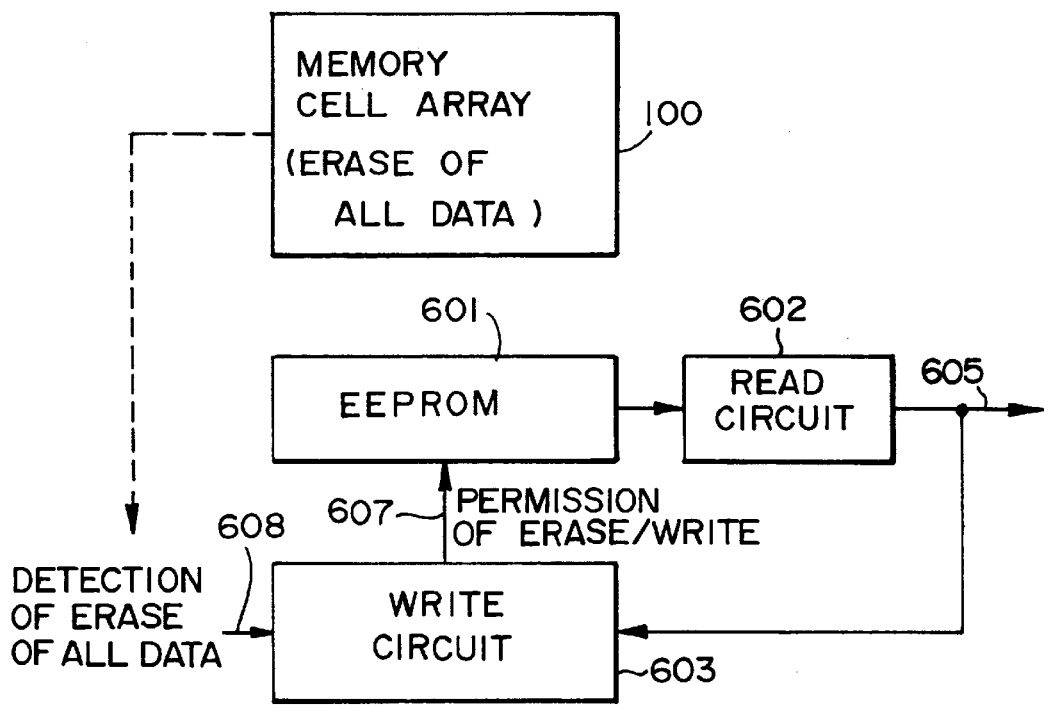

On the other hand, the erase and write relative to the EEPROM 601 (second non-volatile memory) is permitted by activating a flash erase signal 608 when it is detected that all the data in the memory cell array 100 (first non-volatile memory) have been erased, as shown in FIG. 3B. By permitting the erase and write relative to the EEPROM 601, the read protection can be released such that the data can be read out of the memory cell array 100. In other words, the read protection can be released only when all the data are erased from the electrically erasable and writable memory cell array 100.

After the user for the microcomputer has developed a program and written that program into the memory cell array 100, the read protection is set for the memory cell array 100 by the read protection setting signal 117. Thus, the written program will not be falsely copied by third parties. If it is desired that the user re-uses the microcomputer into which the program has been written, all the data in the memory cell array 100 will be erased. In this case, there will not be raised any problem even if all the data are erased from the memory cell array 100 since the user has the source program. When all the data in the memory cell array 100 are erased, the flash erase signal 608 of FIG. 2 is activated to permit the erase and write relative to the EEPROM 601. Thus, the read protection can be released to read the data out of the memory cell array 100. As a result, the user can write a new program into the memory cell array 100 while performing the verifying operation. In other words, the microcomputer can be re-used.

3. Write Circuit in EEPROM

Figure 4A:
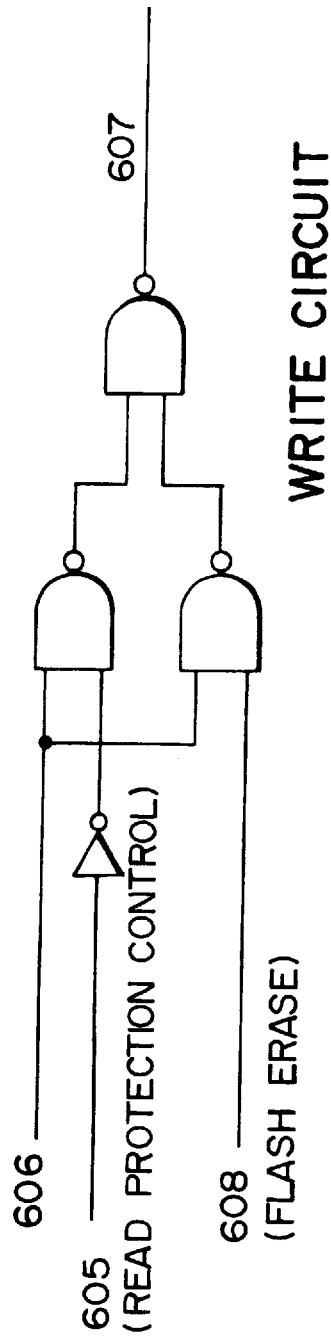
Figure 4B:
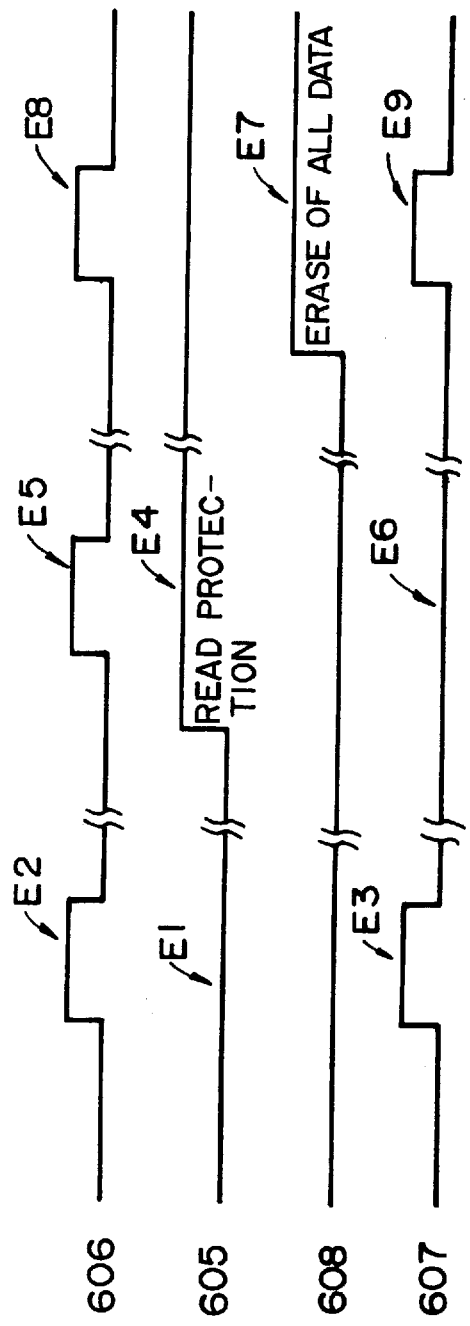
FIG. 4B is a timing chart illustrating the operation of the write circuit.

FIG. 4A shows an example of the write circuit 603 shown in FIG. 2 while FIG. 4B is a timing chart illustrating the operation thereof.

If the read protection control signal 605 is in L level (see E1 in FIG. 4B), the control signal 606 (erase/write signal) is transmitted directly to EEPROM 601 as a control signal 607 (see E2 and E3). Namely, the erase/write of data is permitted in the EEPROM 601.

As the read protection control signal 605 becomes H level (see E4), the control signal 607 is maintained L level even if the control signal 606 becomes H level (see E5 and E6). Namely, the erase/write of data is inhibited in the EEPROM 601. Even if the read protection control signal 605 is in H level, however, the control signal 606 will be transmitted directly to the EEPROM 601 as the control signal 607 when the flash erase signal 608 becomes H level (see E7). In other words, the inhibition of data erase/write is released when all the data are erased in the memory cell array 100. Thus, the read protection can be released in the memory cell array 100.

4. Flash Erase Operation and Erase in Pages or in Blocks

Data in the memory cell array 100 may be erased through the flash erase operation (or batch erase operation) or for each page or block that is addressed.

Figure 5A:
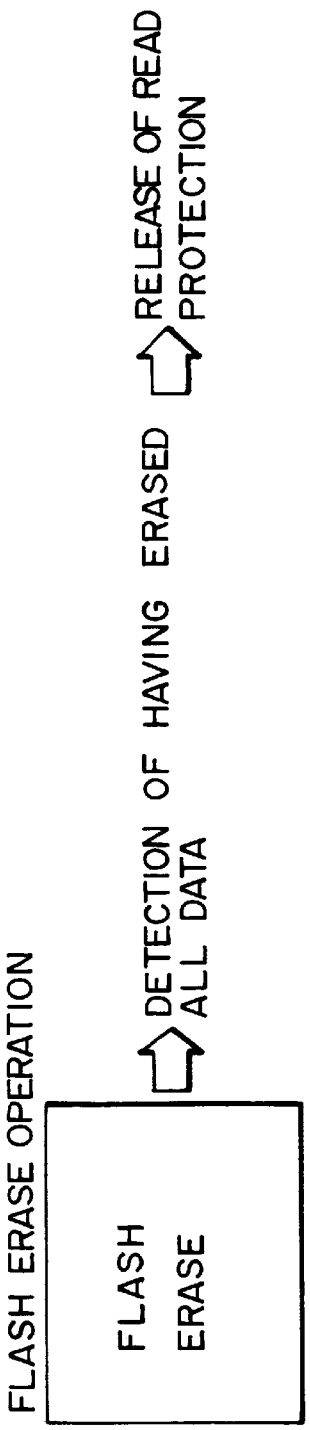
FIGS. 5A, 5B and 5C are views illustrating various techniques of detecting that all the data have been erased.

When all the data in the memory cell array 100 have been erased through the flash erase operation, it can be detected by performing the flash erase operation (or by issuing a flash erase command), as shown in FIG. 5A. Even during the flash erase operation, however, the fact that all the data have been erased may be detected as by activating the CPU 109 of FIG. 1 to read all address data out of the memory cell array 100.

Figure 5B:
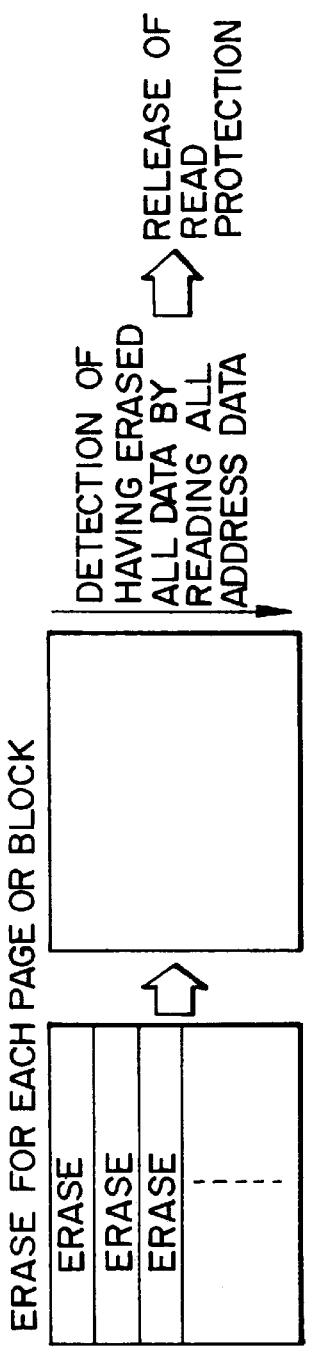
Figure 5C:
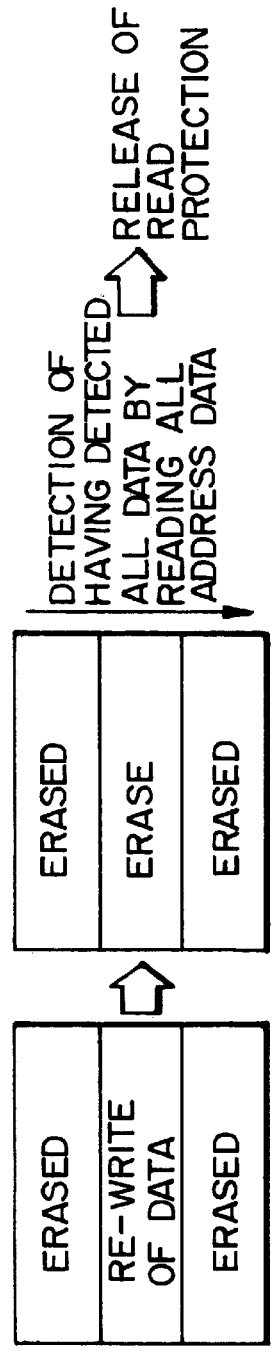

When the erase is to be performed in addressed pages or blocks, the fact that all the data have been erased can be detected as by activating the CPU 109 of FIG. 1 to read all address data out of the memory cell array 100, as shown in FIG. 5B. The pro gram for activating the CPU 109 may be transferred to a RAM before it is executed or may be previously incorporated into a mask ROM.

The technique of FIG. 5A which detects the fact that all the data have been erased from the memory cell array 100 by execution of the flash erase operation provides an advantage in that the circuit can be simplified in structure and control. On the other hand, the technique of FIG. 5B which detects the fact that all the data have been erased from the memory cell array 100 by reading all address data out of the memory cell array 100 provides another advantage in that the lifetime of the memory cell array 100 can be increased. It is now assumed that data are to be written into the memory cell array 100 only at an area with the other area having been erased. When this is performed by erasing only the written area in pages or in blocks rather than the flash erase operation, the stress applied to the respective non-volatile memory cells in the memory cell array 100 can be relieved. Thus, the lifetime of the memory cell array 100 having the definite number of writings can be increased.

5. Power-on Operation

In this embodiment, whether or not the read protection is set for the memory cell array 100 (first non-volatile memory) is determined based on the contents of the EEPROM 601 (second non-volatile memory) read out when the microcomputer Is powered on. More particularly, as shown in FIG. 6, a RESET signal rises to H level (or becomes non-active) after a power source VDD has been thrown and when a given time elapses. Such a rising of the signal to H level produces a differential pulse which is in turn used to read the stored contents out of the EEPROM 601. It is then determined whether or not the read-out of data from the memory cell array 100 should be inhibited. Thus, each time when the microcomputer is powered on, it can be determined whether or not the data stored in the memory cell array 100 should be protected. Even when the microcomputer is powered off, the contents stored in the EEPROM 601 that is a non-volatile memory can be held therein. This realizes a reliable security.

6. Separation Between Erase/Write Controls in Memory Cell Array and EEPROM

Figure 7:
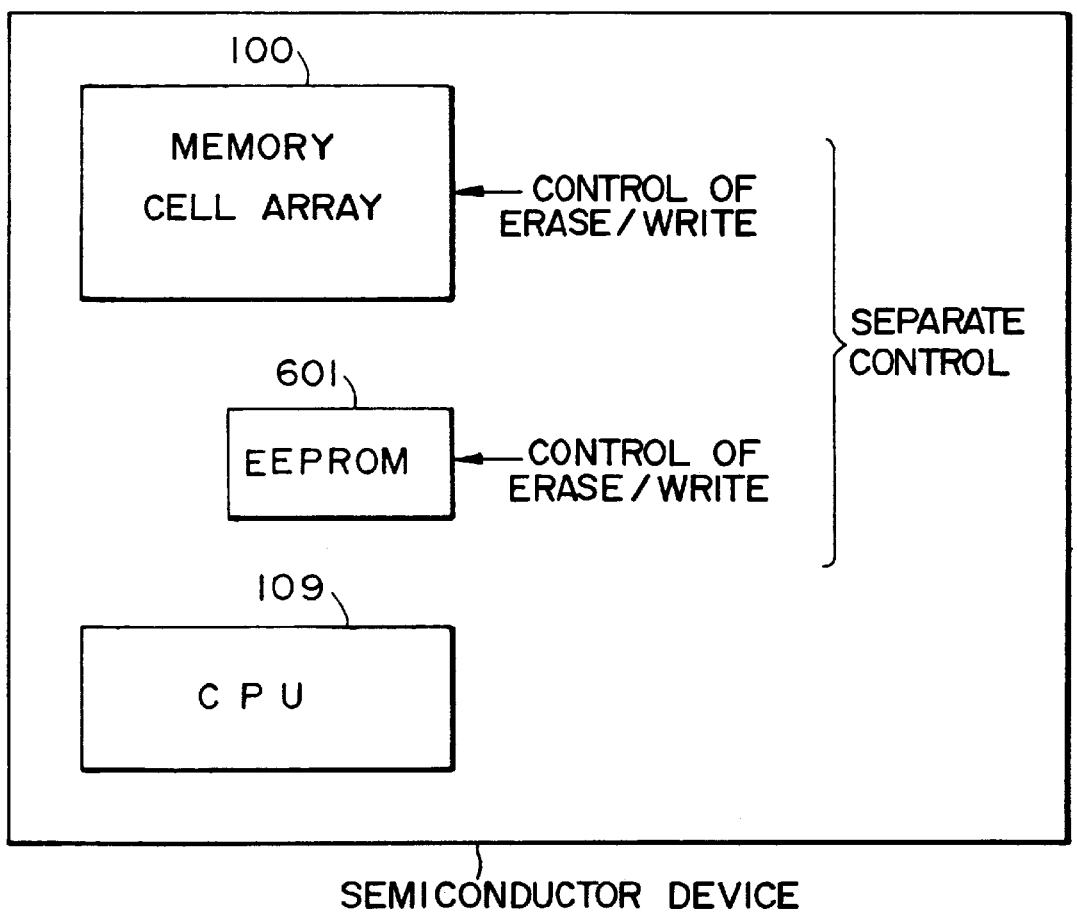
FIG. 7 is a view illustrating a technique of separately controlling a memory cell array and EEPROM.

As shown in FIG. 7, the erase/write operations in the memory cell array 100 (first non-volatile memory) and EEPROM 601 (second non-volatile memory) are controlled separately from each other. For example, the erase/write to the memory cell array 100 may be controlled by the X-decoder 104, Y-decoder 101, sense amplifier 102 or control circuit 106, as shown in FIG. 1. On the other hand, the erase/write to the EEPROM 106 is controlled by the write circuit 603, as shown in FIG. 2. By separately controlling the erase/write operations, it can be determined in power-on whether or not the read-out of data from the memory cell array 100 should be inhibited, after the stored contents in the EEPROM 601 have been confirmed. This can also simply the respective controls while preventing the circuit scale from being increased when the EEPROM 601 is incorporated into the memory cell array 100.

7. Read Protection Control Circuit Using a Plurality of EEPROM'S

FIG. 8 shows another configuration of the read protection control circuit 107. The circuit of FIG. 8 is primarily different from that of FIG. 2 in that it includes a plurality of EEPROM's 701, 704. A write circuit 703 is first responsive to a control signal 707 to erase data in the EEPROM's 701 and 704. Then information that the read protection is enabled is stored in both the EEPROM's 701 and 704. If the EEPROM's 701 and 704 have initially been erased, such an erase operation is not necessarily required.

As shown in FIG. 7, the characteristics of the EEPROM's may disperse due to any problem in processing or other problem since they are laid out on a semiconductor device (semiconductor chip) at a location other than that of the memory cell array. Particularly, such a dispersion may very increase since the area occupied by the EEPROM's is extremely smaller than that of the memory cell array. If the data stored in the EEPROM's are lost due to the dispersion of characteristics, the data programmed in the memory cell array will not be protected.

To overcome such a problem, this embodiment simultaneously use the plurality of EEPROM's 701 and 704 to ensure that the data stored in the memory cell array is protected.

Figures 9A, 9B:
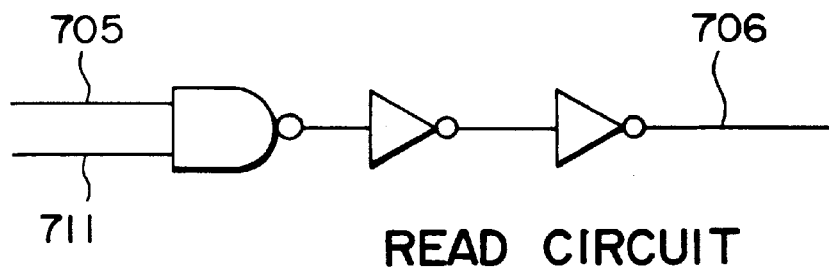

The data written into the EEPROM's 701 and 704 are read out by a read circuit 702. FIG. 9A shows an example of the read circuit 702 while FIG. 9B shows the truth table thereof. If at least one of output signals 705 and 711 from the EEPROM's 701 and 704 is at L level (read protection), the output signal 706 from the read circuit 702 becomes H level (read protection). On the other hand, if both the output signals 705 and 711 are at H level (permission of read-out), the output signal 706 from the read circuit 702 becomes L level (permission of read-out). Even if one of the EEPROM's 701 and 704 is wrongly set, thus, it is ensured that the data stored in the memory cell array is protected.

When the read protection control signal 706 becomes H level, the erase/write to the EEPROM's 701 and 704 will be inhibited. This ensures that the information for the read protection stored in the EEPROM's 701 and 704 will not be re-written. On the other hand, a flash erase signal 710 is activated as it is detected that all the data in the memory cell array 100 have been erased. This permits the erase/write to the EEPROM's 701 and 704 Thus, the read protection can be released to read the data out of the memory cell array 100.

8. Output Control Circuit

The output control circuit 110 of FIG. 1 determines whether data is read out by the CPU 109 or from the outside when the read protection has been set. If the output control circuit 110 is accessed by the CPU 109, the normal read-out operation will be executed. If it is accessed from the outside, the output buffer 103 will be controlled by the output control circuit 110 to output a fixed value.

Figure 10A:
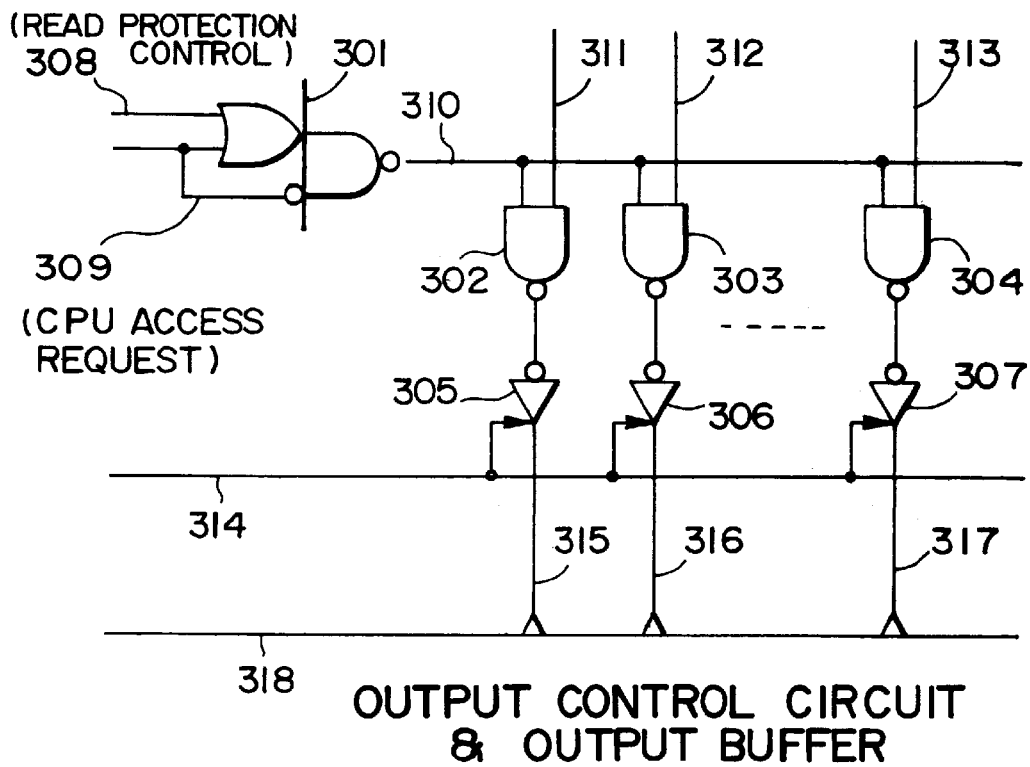
FIGS. 10A and 10B are views showing configurations of an output control circuit and an output buffer.

FIG. 10A shows a configuration of the output control circuit 110 and output buffer 103. A control signal 308 corresponds to the read protection control signal 111 from the read protection control circuit 107. A signal 309 is an access request signal from the CPU 109. Signals 311, 312 and 313 are output signals from the sense amplifier 102. As the access request signal 309 becomes active (or H level), a signal 310 becomes H level irrespectively of the state in the read protection control signal 308. As a read signal 314 from the CPU 109 becomes active, the output signals 311, 312 and 313 are outputted from the sense amplifier toward a data bus 318 (115 in FIG. 1). On the other hand, if the CPU access request signal 309 is inactive (or at L level) when the read protection control signal 308 is at H level, the signal 310 becomes L level. Thus, a fixed L-level value will be outputted toward the data bus 318. Consequently, the read-out of data from the memory cell array 100 will be inhibited.

Figure 10B:
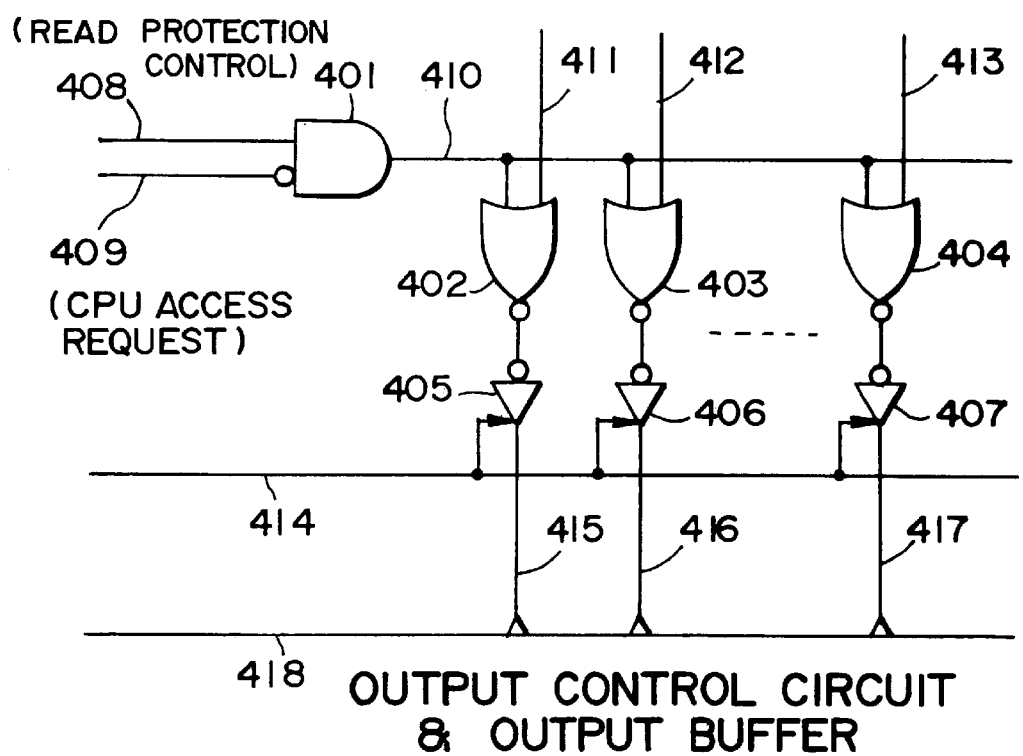

FIG. 10B shows another example of the output control circuit 110 and output buffer 103. As a CPU access request signal 409 becomes active (H level), a signal 410 becomes L level irrespectively of the state in a read protection control signal 408. As a read signal 414 from the CPU 108 becomes active, output signals 411, 412 and 413 from the sense amplifier are outputted toward a data bus 418. On the other hand, if the CPU access request signal 409 is inactive (or at L level) when the read protection control signal 408 is at H level, a signal 410 becomes H level. A fixed H-level value is outputted toward the data bus 418.

9. Another configuration of Microcomputer

Figure 11:
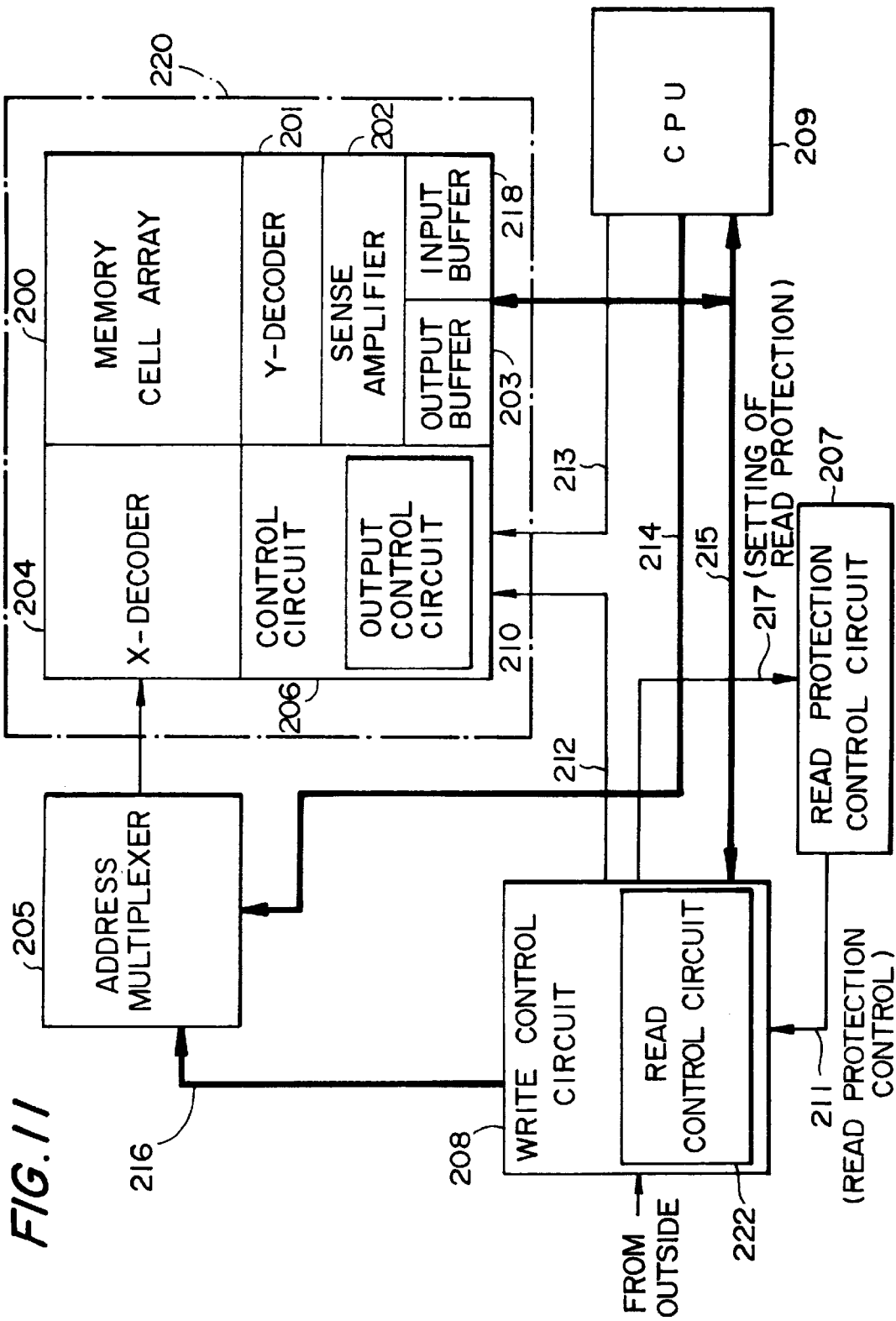
FIG. 11 is a functional block diagram of a configuration of another microcomputer.

FIG. 11 shows another configuration of the microcomputer according to this embodiment. The configuration of FIG. 1 sets the read protection by the use of the read protection setting signal 117 read out by the CPU 109. On the contrary, the configuration of FIG. 11 sets the read protection by the read protection setting signal 217 used by a write control circuit 208. In other words, in the structure of FIG. 1, information for the read protection is stored in the read protection control circuit 107 through operation of the CPU 209, while in the structure of FIG. 11, information for the read protection is stored directly in the read protection control circuit 207 from the outside (ROM writer) of the microcomputer through the write control circuit 208. In FIG. 1, the writing of data to the memory cell array 100 and/or release of read protection are also performed through operation of the CPU. In FIG. 11, however, they are performed directly by the write control circuit 208. The other parts of FIG. 11 are substantially similar to those of FIG. 1, but will not further be described herein.

In FIG. 11, furthermore, the output buffer 203 is controlled by the output control circuit 210 to set the read protection for the memory cell array 200. However, such read protection may be set by a read control circuit 222 newly provided in the write control circuit 208 to control the read-out of data from the outside.

Figure 12A:
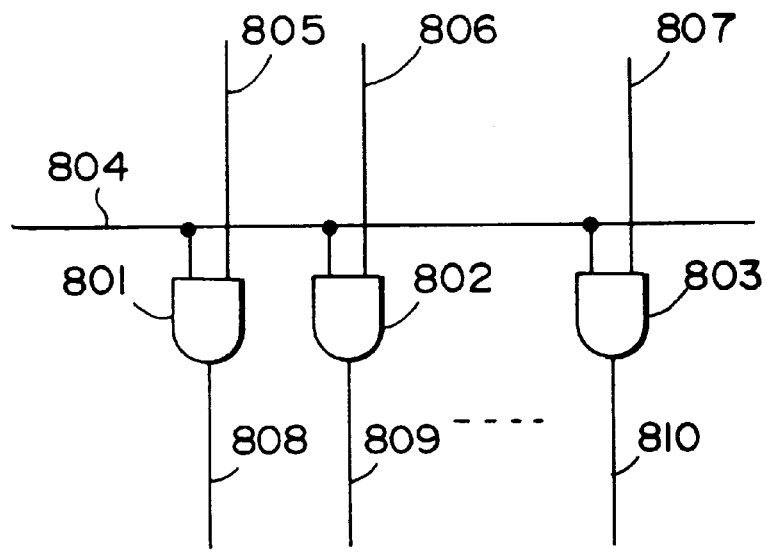
FIGS. 12A and 12B are views showing read control circuits.

FIG. 12A shows an example of the read control circuit 222. Signals 805, 806 and 807 are coupled with a data bus 215 shown in FIG. 11. When information for the read protection is stored in the read protection control circuit 207, a read protection signal 804 becomes L level while all of output signals 808, 809 and 810 are fixed at L level. Thus, the read-out of data from the outside will be inhibited.

Figure 12B:
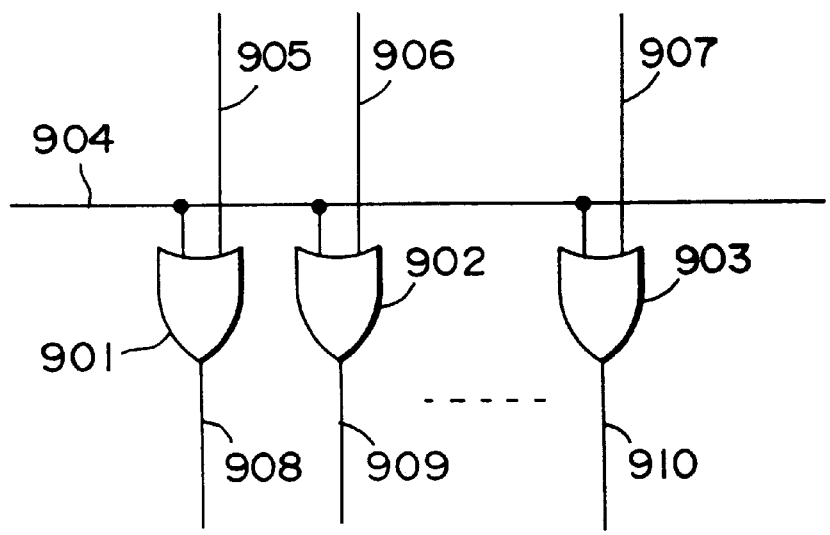

FIG. 12B shows another example of the read control circuit 222. Signals 905, 906 and 907 are coupled with the data bus 215. When information for the read protection is stored in the read Protection control circuit 207, a read protection signal 904 becomes H level while all of the output signals 808, 809 and 810 are fixed at H level. Thus, the read-out of data from the outside will be inhibited.

10. Still Another Configuration of Microcomputer

FIG. 13 shows still another example of the microcomputer according to this embodiment. This figure corresponds to a combination of the configuration shown in FIG. 1 with that of FIG. 11.

(1) Normal Operation Mode

In the normal operation mode, CPU 18 is activated based on data that have been stored in a non-volatile memory block 10. CPU 18 inputs an address into the non-volatile memory block 10 through an address bus 30 and selector 20. Data read out from the non-volatile memory block 10 is used to cause the CPU 18 to perform a given process. Thus, the CPU 18 can be operated based on the data that have been programmed to the non-volatile memory block 10 by the user.

In FIG. 13, there are provided two programming modes for storing data in the non-volatile memory clock 10, that is, a programming mode using parallel write (which will be referred to "parallel mode") and another programming mode using serial write (which will be referred to "serial mode"). Selection of these modes, normal operation mode, parallel mode and serial mode depends on detection of a specific terminal state in the microcomputer when it is powered on or when RESET signal is released.

(2) Parallel Mode

In the parallel mode, various data are inputted and written into a memory control register 12 from an external ROM writer or the like through a parallel terminal 34. The data written into the memory control register 12 are externally outputted through the parallel terminal 36. Addresses in the register are specified by addresses inputted into the memory control register 12 from a parallel terminal 34. FIG. 14 shows an example of the memory control register 12. Memory addresses inputted through the parallel terminal 34 are written into bits MA15–MA0. Similarly, memory data are written into bits MD7–MD0 when data are written into the non-volatile memory block and read out from the bits MD7–MD0 when data are read out from the non-volatile memory block. The memory control register 12 has control bits ERASE, FLASH, PROG, PROT, ER348 and so on. These control bits may be written and/or read through the parallel terminals 34 and 36.

The memory addresses written into the memory control register 12 at the bits MA15–MA0 are outputted toward the non-volatile memory block 10 through the selector 20. In data writing, the memory data written into the memory control register 12 at the bits MD7–MD0 are outputted toward the non-volatile memory block 10 through the selector 24 and written into the aforementioned memory address locations. In data reading, the data of the non-volatile memory block 10 are read out from the aforementioned memory address locations and written into the memory control register 12 at the bits MD7–MD0 through the selector 24.

The non-volatile memory block 10 is controlled by various control bits shown in FIG. 14. For example, when the data in the non-volatile memory block 10 are to be erased, ERASE is enabled. When the flash erase operation is to be performed, FLASH is enabled. When it is desired to write data into the non-volatile memory block 10, PROG is enabled.

The control bits of FIG. 14 may be used to control a read protection control circuit 14 shown in FIG. 13. For example, if it is desired to set read protection for the non-volatile memory block 10, PROT is made H level. If it is desired to permit the read-out of data in the non-volatile memory block 10, PROT is made L level. Thus, the information for the read protection or read permission will be stored in EEPROM included in the read protection control circuit 14. If the read protection is set, a read protection control signal 15 becomes active to protect the data in the non-volatile memory block 10 from being read out. Erase/write to the EEPROM in the read protection control circuit 14 will also be inhibited. When it is detected that all the data in the non-volatile memory block 10 have been erased (see ER 348 in FIG. 14), the erase/write to the EEPROM in the read protection control circuit 14 will be permitted. Thus, the inhibition or permission of data read-out to the non-volatile memory block 10 can be reset.

In the parallel mode, the read protection can directly be set, or data can be directly programmed into the non-volatile memory block, from the outside through the write control circuit, as in FIG. 11.

(3) Serial Mode

In the serial mode, the CPU 18 operates based on a program stored in a mask ROM 16. Data are also delivered between the outside and the memory control register 12 through a serial terminal 38. When the CPU 18 operates based on the program stored in the mask ROM 16, the CPU 18 uses bits SC3–SC0 or SS3–SS0 shown in FIG. 14 to analyze data that have been stored in bits SD7–SD0. For example, if it is determined that the data stored in the bits SD7–SD0 are memory addresses, they are stored in bits MA15–MA0. If it is determined that the data are control bits, they are stored in the corresponding control bits. According to the serial mode, the programming of data to the non-volatile memory block 10 can be realized with less number of terminals. Therefore, it is, for example, possible that the programming is carried out while having been mounted the microcomputer on a system board.

In the serial mode, the CPU can be operated to set the read protection or to program data into the non-volatile memory block, as in FIG. 1.

(4) Output Control Circuit

Figures 15A, 15B:
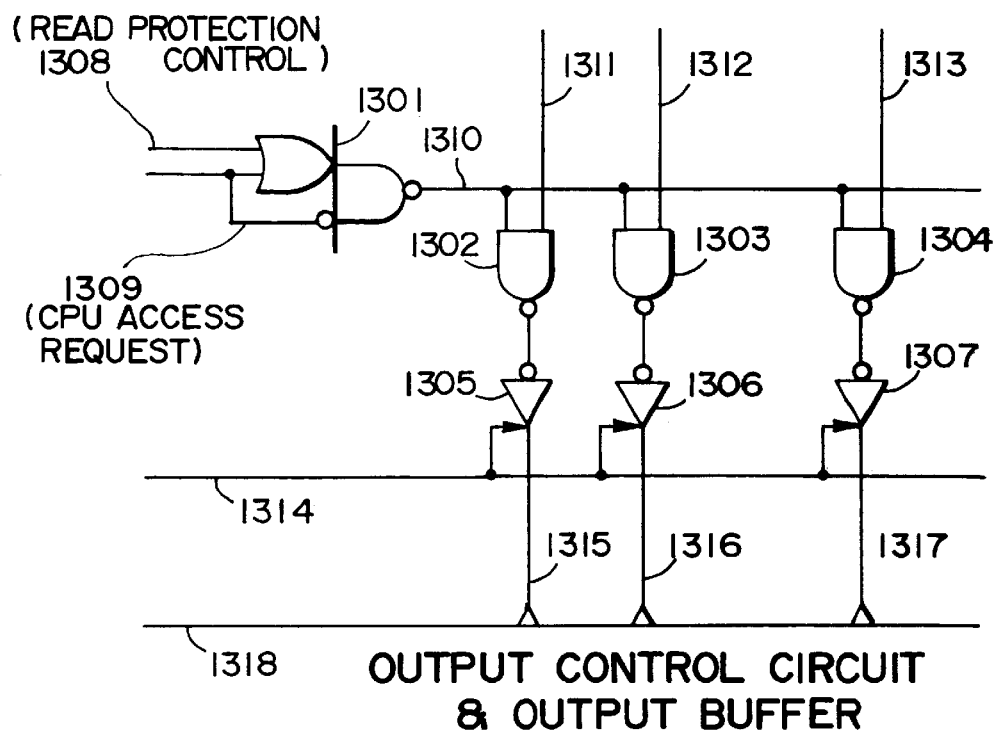

FIG. 15A shows another configuration of the output control circuit 40 and output buffer 42 which are included in the non-volatile memory block 10 while FIG. 15B shows the truth table thereof. The configuration of FIG. 15A is similar to that of FIG. 10A.

CPU access request signal 1309 becomes active (or at H level) in the normal operation mode. As shown in FIG. 15B, when the CPU access request signal 1309 becomes active, a signal 1310 becomes H level irrespectively of the state in a read protection control signal 1308. As a read signal 1314 from the CPU becomes active, output signals 1311, 1312 and 1313 from the sense amplifier are outputted toward a data bus 1318 (32 in FIG. 13).

On the other hand, the CPU access request signal 1309 becomes inactive (or L level) in the parallel or serial mode other than the normal operation mode. If the CPU access request signal 1309 is at L level (or inactive) with the read protection control signal 1309 being at H level (inhibition), the signal 1310 becomes L level. Thus, a fixed L-level value will be outputted toward the data bus 1318.

11. Electronic Equipment

Figure 16:
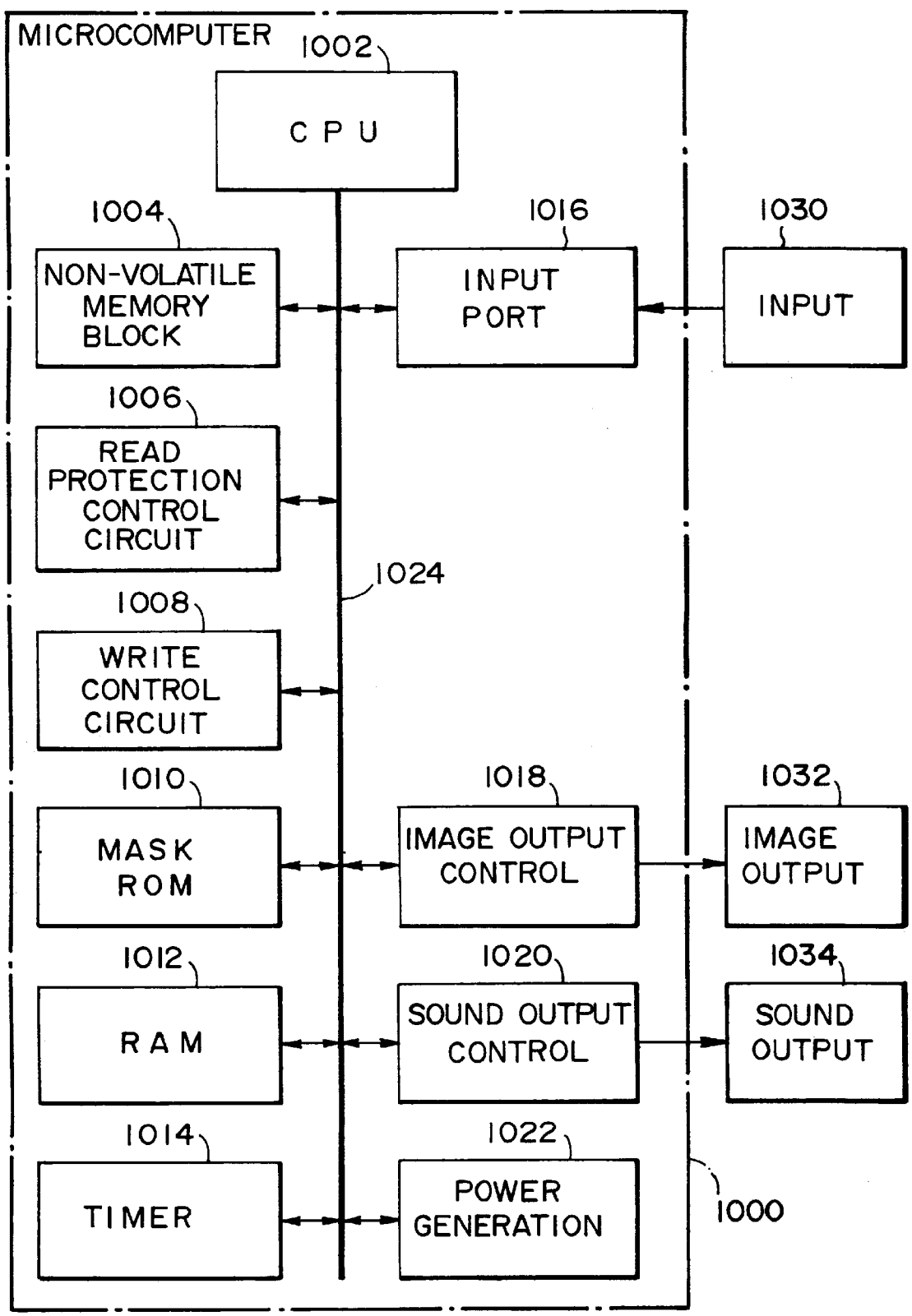
FIG. 16 is a functional block diagram of an electronic equipment comprising a microcomputer.

FIG. 16 shows a functional block diagram of an electronic equipment which includes such a microcomputer as described. The electronic equipment comprises a microcomputer (semiconductor device) 1000, an input section 1030, an image output section 1032 and a sound output section 1034. The microcomputer 1000 comprises a CPU 1002, a non-volatile memory block 1004, a read protection control circuit 1006, a write control circuit 1008, mask ROM 1010, a RAM 1012, a timer 1014, an input port 1016, an image output control section 1018, a sound output control section 1020, a power source generating section 1022 and a bus (address and data) 1024.

The RAM 1012 provides a working area for the CPU 1002 or the like. The timer 1014 has various timepiece functions including watch, calendar and so on. The input port 1016 receives data from the input section 1030. The image output control section 1018 controls the image outputs in the image output section 1032 which may be in the form of LCD or CRT. If the image output section 1032 is LCD, the image output control section 1018 provides an LCD driver. The sound output control section 1020 controls the sound outputs in the sound output section 1034 which may be in the form of a speaker. If the electronic equipment is a game machine, outputs of game sound are controlled by the sound output control section 1020. The power source generating section 1022 generates various power sources (e.g., high voltage source for EEPROM) which are used in the microcomputer 1000.

Figure 17A:
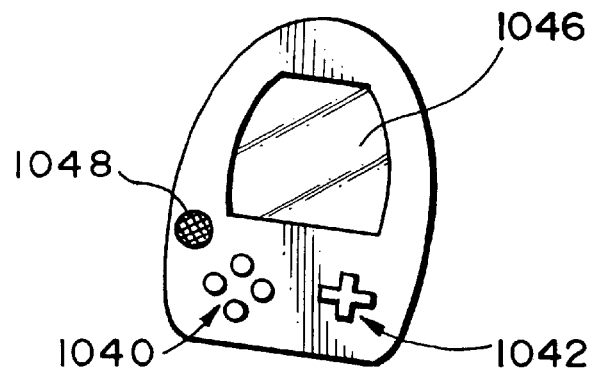
FIGS. 17A, 17B and 17C are view showing the appearance of various electronic equipment.

FIG. 17A shows the appearance of an electronic equipment which, is in the form of a portable game machine. The user manipulates control buttons 1040 and a cross key 1042 on an input section to input operational data into the machine. With the operational data from the user, a game program written into a non-volatile memory or the like is used to generate game images and game sounds. These game images and sounds are externally outputted from a display 1046 and a speaker 1048. This embodiment can preclude the game program written into the non-volatile memory block from being falsely copied by third parties. It is also possible that the game machines in each of which a game program is being protected by setting the read protection are commercially delivered to a market. After the reaction in the market has been checked, the game machines are collected. The collected game machines can be re-delivered to the market after the game program has been re-written to a version-up program. In this case, the re-writing of the game program can be carried out by erasing all the data in the non-volatile memory block.

Figure 17B:
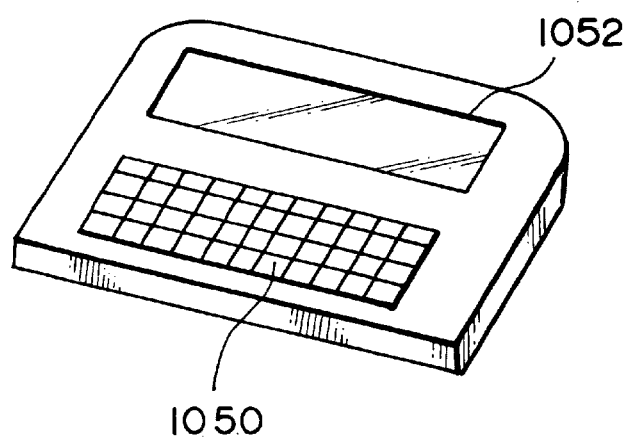

FIG. 17B shows the appearance of an electronic equipment which is in the form of an electronic note. The user inputs the desired data into the electronic equipment through a keyboard 1050 which is an input section. Information including letters and numerals stored into the electronic note by the user are shown in the display 1052. This embodiment can protect the program or the like for operating the electronic note and re-use the electronic note and the microcomputer included therein.

Figure 17C:
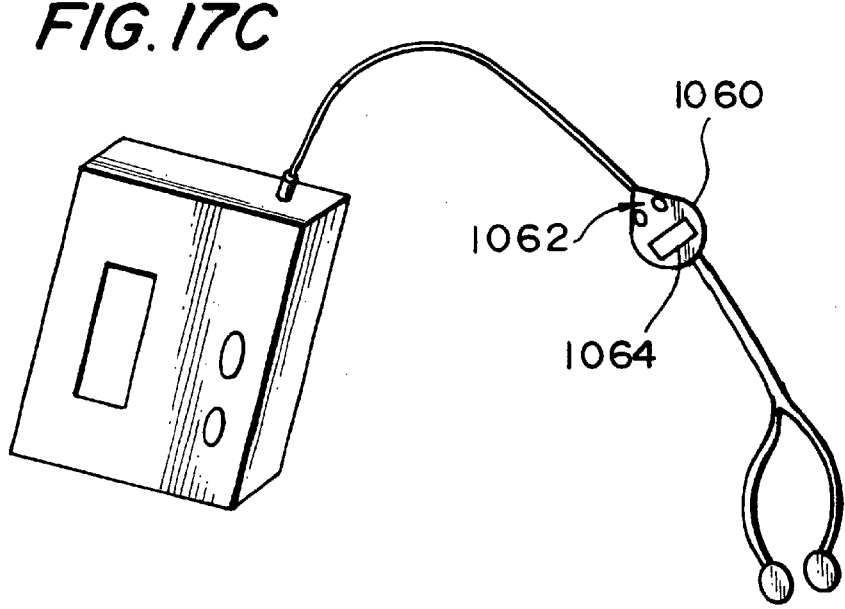

FIG. 17C shows the appearance of an electronic equipment which is in the form of a portable audio instrument (mini disk (MD) player, compact disk (CD) player or cassette deck). In this case, for example, a remote controller 1060 in a headphone includes a microcomputer constructed according to this embodiment. The user can manipulate control buttons 1062 to perform the reproduction and/or rapid feed in the audio device while confirming the contents shown by a display 1064 on the remote controller 1060. This embodiment can protect the program or the like for operating the remote controller and re-use the remote controller and the microcomputer included therein.

The electronic equipment to which this embodiment can be applied is not limited to those of FIGS. 17A, 17B and 17C, but may be embodied in any of various types such as readers in information storage devices (e.g., CD-ROM, digital video disk (DVD) and so on), portable telephones, printers, car navigation systems, personal computers and the like.

The present invention is not limited to the aforementioned and illustrated embodiments, and various modifications can be made within the scope of the present invention.

For example, the present invention may be applied to any of various semiconductor devices other than the described microcomputer which is one of the semiconductor devices. For example, FIG. 18 shows a functional block diagram of a semiconductor device which includes a gate array block 509 functioning as a logical function block. Such a semiconductor device is different from that of FIG. 11 in that the CPU is replaced by the gate array block 509. The other parts of FIG. 18 are similar to those of FIG. 11, but will not further be described herein. When the gate array block 509 has various logical functions such as digital signal processing, error correction, image generation, sound generation, data compression and so on, various processes can be performed based on data that are written into a non-volatile memory block 520.

Although the embodiments of the present invention have been described as to non-volatile memories that are in the form of EEPROM, the EEPROM may be replaced by any of various other memory units other than the EEPROM, such as a strong dielectric memory or the like.

The technique of setting the read protection, the technique of detecting the erase of all the data and the technique of releasing the read protection are not limited to those described in connection with the embodiments of the present invention although they are desirable in embodying the present invention.

The configuration of the read protection means is not limited to that described in connection with the embodiments of the present invention although they are desirable in embodying the present invention.

What is claimed is:

1. A semiconductor device comprising:

a first non-volatile memory in which data can be written and from which data can be erased electrically from the outside of said semiconductor device;

read protection means for protecting data written in said first non-volatile memory from being read out from the outside for security of data; and release means for releasing the read protection for said first non-volatile memory when erase of all data in said first non-volatile memory is detected.

2. The semiconductor device as defined in claim 1, wherein a flash erase operation is carried out for erasing all data in said first non-volatile memory; and wherein erase of all data in said first non-volatile memory is detected based on whether said flash erase operation is performed or not.

3. The semiconductor device as defined in claim 1, wherein data in said first non-volatile memory is erased in any one of pages and blocks by specifying an address; and wherein erase of all data in said first non-volatile memory is detected by reading out all address data of said first non-volatile memory.

4. The semiconductor device as defined in claim 1, wherein said read protection means includes at least one second non-volatile memory in which data can be written, from which data can be erased electrically, and which stores information that the read protection for said first non-volatile memory is enabled.

5. The semiconductor device as defined in claim 4, wherein said read protection means protects said second non-volatile memory from being written or erased when said second non-volatile memory stores the information that the read protection for said first non-volatile memory is enabled; and wherein said read protection means permits said second non-volatile memory to be written or erased when erase of all data in said first non-volatile memory is detected.

6. The semiconductor device as defined in claim 4, wherein whether the read protection for said first non-volatile memory will be enabled or disabled is determined based on the contents stored in said second non-volatile memory which are read out when said semiconductor device is powered on.

7. The semiconductor device as defined in claim 4, wherein the write and erase operations in said first non-volatile memory is control led separately from the write and erase operations in said second non-volatile memory.

8. The semiconductor device as defined in claim 4, wherein said read protection means has a plurality of said second non-volatile memories; and wherein said read protection means protects data in said first non-volatile memory from being read out from the outside when at least one of signals output from said second non-volatile memory indicates that the read protection for said first non-volatile memory is enabled.

9. The semiconductor device as defined in claim 1, wherein the read protection for said first non-volatile memory and release of the read protection is executed through a central processing unit (CPU) included in said semiconductor device.

10. The semiconductor device as defined in claim 1, wherein said read protection means protects data in said first non-volatile memory from being read out from the outside by controlling an output buffer which outputs data stored in said first non-volatile memory.

11. The semiconductor device as defined in claim 1, wherein said read protection means protects data in said first non-volatile memory from being read out from the outside by controlling a read control circuit which controls read of data stored in said first non-volatile memory from the outside.

12. The semiconductor device as defined in claim 1, wherein in a normal operation mode, in which one of a central processing unit (CPU) and a logical function block operates based on data stored in said first non-volatile memory, one of said CPU and said logical function block can read out data stored in said first non-volatile memory even if the read protection for said first non-volatile memory is enabled; and wherein in any mode other than said normal operation mode, one of said CPU and said logical function block can read out data stored in said first non-volatile memory only when the read protection for said first non-volatile memory is released.

13. The semiconductor device as defined in claim 1, further comprising a central processing unit (CPU) which operates based on data stored in said first non-volatile memory.

14. The semiconductor device as defined in claim 1, further comprising a logical function block which operates based on data stored in said first non-volatile memory.

15. Electronic equipment comprising:

semiconductor device as defined in claim 1;

input means for inputting data into said semiconductor device; and output means for outputting at least one of image and sound under control of said semiconductor device.

16. Electronic equipment comprising:

semiconductor device as defined in claim 4;

input means for inputting data into said semiconductor device; and output means for outputting at least one of image and sound under control of said semiconductor device.

17. Electronic equipment comprising:

semiconductor device as defined in claim 11;

input means for inputting data into said semiconductor device; and output means for outputting at least one of image and sound under control of said semiconductor device.

* * * * *